Oct. 8, 1935.    E. F. WESTON    2,016,469
EXPOSURE METER
Filed Dec. 31, 1931    2 Sheets-Sheet 1
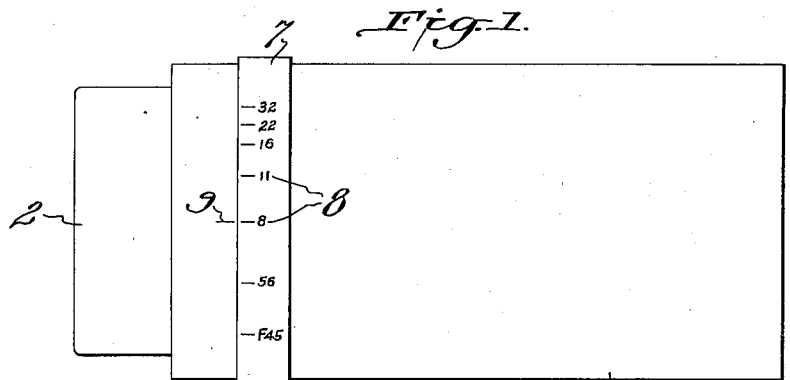
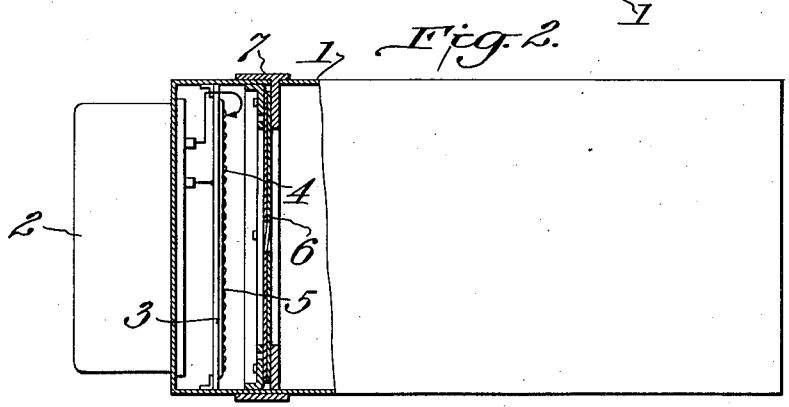
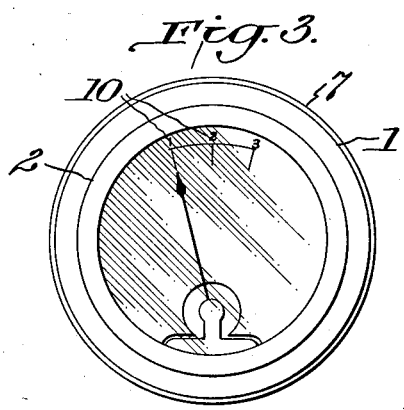
Inventor:
Edward F. Weston,
By Byrnes Townsend & Potter,
Attorneys.

Oct. 8, 1935.  E. F. WESTON  2,016,469
EXPOSURE METER
Filed Dec. 31, 1931  2 Sheets-Sheet 2

Inventor:
Edward F. Weston,
By Byrnes, Townsend & Potter,
Attorneys.

Patented Oct. 8, 1935

2,016,469

UNITED STATES PATENT OFFICE 2,016,469

EXPOSURE METER

Edward F. Weston, Elizabeth, N. J., assignor to Weston Electrical Instrument Corporation, Newark, N. J., a corporation of New Jersey Application December 31, 1931, Serial No. 584,267

5 Claims. (Cl. 88—23)

This invention relates to exposure meters for the direct determination of the correct exposure conditions in accordance with the intensity of the illumination of the object or scene to be photographed.

It has been proposed to employ combinations of batteries, light-sensitive resistances and measuring instruments as exposure meters, but such devices have been of comparatively large size and have not been, in general, of practical utility. It has also been proposed to employ light-sensitive current generating cells and measuring instruments for this purpose but the proposed arrangements have not been entirely satisfactory in view of the relatively low current output of the cells, the mechanical construction of the cells and/or the operating convenience of the assembly.

An object of the invention is to provide a simple, rugged and compact exposure meter of the type including an actinoelectric cell and an electrical measuring instrument. A further object is to provide an exposure meter of the type stated in which the measuring instrument is provided with one significant graduation for each typical film speed, and an adjustable diaphragm is provided for controlling the relative amount of light radiated from the object to be photographed to the current-generating cell, a scale being provided for showing the aperture to be employed, for a given length of exposure, in accordance with the diaphragm setting which results in a movement of the instrument needle to the predetermined setting for the particular type of film or plate which is to be used.

A further object of the invention is to provide an exposure meter including a current-generating cell which responds, with substantially true fidelity, to all actinic light rays, and which therefore affords a correct indication of the magnitude of the effective illumination of the object to be photographed.

These and other objects and advantages of the invention will be apparent from the following specification and the accompanying drawings, in which:

Fig. 1 is a side elevation of one embodiment of the invention,

Fig. 2 is a similar side elevation with parts shown in section,

Fig. 3 is an end view of the exposure meter as seen from the measuring instrument end thereof.

Figure 4:
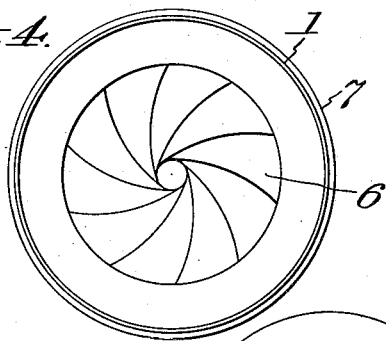
Fig. 4 is an end view as seen from the opposite direction.
Figure 5:
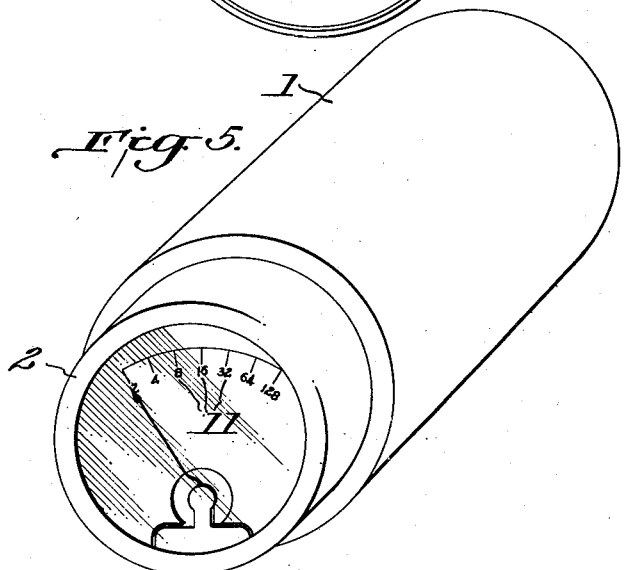
Figs. 5 and 6 are a perspective view and a side elevation, respectively, of other embodiments of the invention.

In the drawings, the reference numeral 1 identifies the cylindrical shield tube which is secured to and projects rearwardly from the cylindrical casing of an electrical measuring instrument 2. The instrument thus closes one end of the shield tube and cooperates with the same to form a casing for the complete exposure meter. As shown in Fig. 2, the terminals of the measuring instrument 2 are connected, respectively, to the backing plate 3 and grid or collecting electrode 4 of an actinoelectric cell of the current generating type. Cells of this type preferably have collecting electrodes 4 in the form of apertured grids which permit light rays to contact directly with the selenium light-sensitive layer 5 of the cell, and therefore avoid the filter action or non-uniform response over the entire actinic spectrum which characterizes some types of photoelectric devices.

At the side of the cell opposite the measuring instrument 2, an iris diaphragm 6 is arranged which, as is common in the photographic art, is adjustable by a ring 7 which overlies the casing. The variable aperture diaphragm 6 is located some distance back of the forward end of the casing 1, and the interior wall of the casing is preferably blackened to restrict the illumination of the light-sensitive cell to rays reflected from the object towards which the axis of the casing 1 is directed.

The ring 7 of the adjustable diaphragm bears a scale 8 graduated in standard aperture size, which cooperates with a fixed fiducial mark 9 on the casing 1. The measuring instrument 2 carries a plurality of marks 10 which are angularly spaced in accordance with the relative speeds of different types of films, the marks having appropriate legends, here indicated by letters A, B, C, to identify the types of films.

An exposure meter having such scale graduations is appropriate for use with an amateur motion picture camera having a fixed time of exposure. In operation, the forward or diaphragm end of casing 1 is directed towards the object or scene to be photographed and the diaphragm ring 7 is adjusted to bring the pointer of instrument 2 into coincidence with the particular mark 10 (illustrated as mark A in Fig. 2) which corresponds to the type of film being used. The reading on scale 8, which, as shown in Fig. 1, is F8, indicates the correct aperture opening to be used for proper exposure of the film.

It will be apparent that, for cameras having adustable shutter speeds, the indicated value of the aperture to be used for a given exposure period, say one-twentieth of a second, may be appropriately varied, in accordance with known practice, if some other exposure period is desired.

A somewhat simpler construction may be employed by calibrating the scale 11 of the measuring instrument 2 with graduations indicating the correct aperture for the exposure, for a predetermined shutter speed, of a single type of film. In this form, the adjustable iris diaphragm is not employed, the aperture being indicated directly by the position of the instrument pointer when the axis of the casing 1 is directed toward the scene or object to be photographed. This simpler type of exposure meter may, of course, be used to determine the exposure conditions for other shutter speeds and other types of films as the aperture size for one shutter speed and film may be appropriately modified, in the usual manner, for a different exposure period and/or different film speed.

Figure 6:
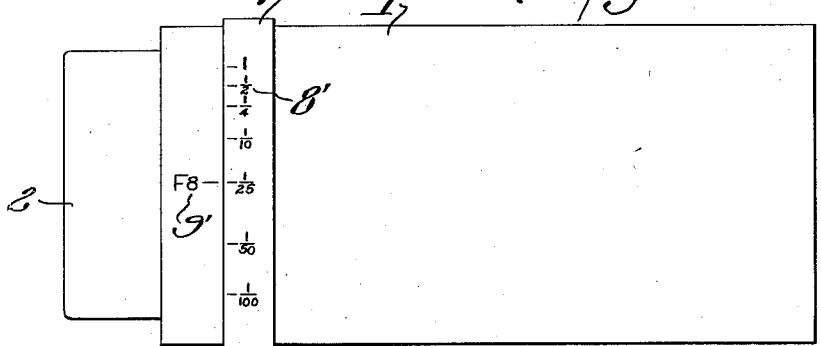

A modified scale arrangement for an exposure meter of the type shown in Fig. 1 is illustrated in Fig. 6. For use with cameras having adjustable shutter speeds, it may be more convenient to graduate the scale 8' in terms of exposure periods for a given aperture which, as shown in Fig. 6, is noted by the legend "F8" adjacent the fixed fiducial mark 9'.

The three factors which affect the exposure are film speed, diaphragm opening and exposure time. For each of the described embodiments of the invention, a definite value was assumed for one of these factors and the instrument scale and diaphragm ring scale were then appropriately graduated in units of the other two factors. With some sets of scale graduations the most convenient method of determining the exposure data will be to adjust the diaphragm ring to bring the pointer to a predetermined position on the instrument scale, while with other graduations on the respective scales the operator may employ the alternative method of first setting the diaphragm ring to a desired value and then noting the instrument reading.

The use of a photoelectric cell which is free from filter action, i. e., which does not absorb or suppress any substantial portion of the actinic rays, is particularly advantageous in an exposure meter as it permits the direct measurement of the exposure period or aperture size in accordance with the actinic rays falling upon the sensitive film. If color filters are to be employed in the exposure, the color filter may be fitted over the forward end of the casing 1 to filter out those actinic rays which will not reach the film. The exposure meter will then indicate the correct exposure for the particular operating conditions, thus rendering a separate mental operation unnecessary when a light filter is to be used.

While the described embodiments of the invention represent the forms which are now preferred, it will be apparent that there may be considerable latitude in the form and relationship of the several component elements without departure from the scope of the invention as set forth in the following claims.

I claim:

1. In an exposure meter, an elongated tubular casing having its interior walls blackened to prevent reflection of light, a current generating photoelectric device spaced from an open end of said casing to receive a restricted beam of light entering at and axially of the open end of said tube, and a current measuring instrument adjacent said device and closing the other end of said tube, said instrument including a movable pointer and a scale graduated in one of the factors which determines the exposure conditions.

2. In an exposure meter, the combination with a tubular casing having a blackened interior wall, an electrical measuring instrument at and constituting a closure for one end of said casing, said instrument having a scale graduated in values of one of the factors affecting the exposure of a film, a photoelectric cell of the current-generating type within said casing and adjacent said instrument, an adjustable diaphragm between said cell and the other end of said casing, means for adjusting said diaphragm from the exterior of said casing, and a cooperating scale and fiducial mark on said casing and adjusting means, said cooperating scale being graduated in values of a second exposure factor.

3. The invention as set forth in claim 2, wherein the scale of said instrument has a significant mark corresponding to a predetermined type of film, and the said cooperating graduated scale and fiducial mark indicate the correct exposure period and aperture when said diaphragm is adjusted to bring the instrument pointer into coincidence with said mark.

4. A photoelectric exposure meter comprising a housing enclosing a photocell capable of generating current which is a function of the illumination at the photocell, a measuring instrument in series circuit with said photocell, said instrument including a scale having a fiducial index and a pointer movable over said scale and controlled in its movement solely by the magnitude of the current flow established in said series circuit, means adjustable manually to vary the current output of said photocell for a given light value at the object to be photographed, and cooperating indexes respectively carried by said housing and movable with said adjustable means for indicating a diaphragm opening and the corresponding exposure time when the adjustable means is set to bring the instrument pointer into alignment with the fiducial mark.

5. A photographic exposure meter as claimed in claim 4, wherein one of said indexes other than the scale of exposure time includes a plurality of spaced markings signifying different film speeds.

EDWARD F. WESTON.